US012143759B1

(12) United States Patent
Audi et al.

(10) Patent No.: US 12,143,759 B1
(45) Date of Patent: Nov. 12, 2024

(54) METHOD FOR MAKING A SPEAKER COVER FOR ENHANCED AUDIO PERFORMANCE

(71) Applicant: OAKWOOD METAL FABRICATING CO., Dearborn, MI (US)

(72) Inventors: Richard Francois Audi, Dearborn, MI (US); Donald Scott Smith, Commerce, MI (US); Joel Matthew Cormier, Lathrup Village, MI (US); Michael Anthony Rossi, Grosse Ile, MI (US); Mark Steven Kunitz, Newport, MI (US); Kevin Matthew Ward, Wyandotte, MI (US)

(73) Assignee: OAKWOOD METAL FABRICATING CO., Dearborn, MI (US)

( * ) Notice: Subject to any disclaimer, the term of this patent is extended or adjusted under 35 U.S.C. 154(b) by 931 days.

(21) Appl. No.: 17/154,715

(22) Filed: Jan. 21, 2021

Related U.S. Application Data

(63) Continuation-in-part of application No. 16/751,080, filed on Jan. 23, 2020, now Pat. No. 11,575,982.

(51) Int. Cl.

| | |
|---|---|
| ***H04R 31/00*** | (2006.01) |
| ***H04R 1/02*** | (2006.01) |
| *A63F 9/24* | (2006.01) |

(52) U.S. Cl.
CPC ........ *H04R 1/028* (2013.01); *A63F 2009/247* (2013.01)

(58) Field of Classification Search
CPC ........ H04R 1/023; H04R 1/028; H04R 1/323; H04R 29/001; H04R 2201/029
See application file for complete search history.

(56) References Cited

U.S. PATENT DOCUMENTS

| | | | | |
|---|---|---|---|---|
| 4,185,402 A * | 1/1980 | Digate | A43B 17/102 | 36/44 |
| 5,652,413 A * | 7/1997 | Mulera | H04R 1/023 | 181/150 |

(Continued)

FOREIGN PATENT DOCUMENTS

| | | |
|---|---|---|
| CA | 2011619 C | 1/1999 |
| CN | 107948767 A | 4/2018 |

(Continued)

*Primary Examiner* — Paul D Kim
(74) *Attorney, Agent, or Firm* — Brooks Kushman P.C.

(57) ABSTRACT

A method for making an audio speaker cover using at least some of the following steps, not necessarily in the sequence listed: evolving a CAD first stage model of an audio speaker cover with an array of apertures; determining a desired blank workpiece manufacturing configuration by electing to process a single blank workpiece or an assembly of stacked blank workpieces; affixing the single blank workpiece or stacked blank workpieces in relation to a CNC machine; addressing one or more of the stacks simultaneously or sequentially to create apertures in the audio speaker covers with parallel walls and square shoulders to provide strength while minimizing losses in sound transmission, the apertures and intervening lands providing a visually attractive appearance to an observer.

20 Claims, 4 Drawing Sheets

(56) References Cited

U.S. PATENT DOCUMENTS

| | | | | |
|---|---|---|---|---|
| 5,754,669 | A * | 5/1998 | Shiota | H04R 1/023<br>381/189 |
| 7,643,968 | B1 * | 1/2010 | Lambert | G06F 30/00<br>703/2 |
| 9,014,411 | B2 | 4/2015 | Rodgers | |
| 2007/0177754 | A1 | 8/2007 | Kemmerer | |
| 2007/0263878 | A1 | 11/2007 | Yu et al. | |
| 2010/0091442 | A1 * | 4/2010 | Theobald | G06F 1/1658<br>361/679.55 |

FOREIGN PATENT DOCUMENTS

| | | | |
|---|---|---|---|
| DE | 102019007656 | A1 | 8/2020 |
| JP | H07225587 | A | 8/1995 |
| JP | 2018008645 | A | 1/2018 |
| KR | 100313022 | B1 | 11/2001 |
| WO | 2020133911 | A1 | 7/2020 |

* cited by examiner

METHOD FOR MAKING A SPEAKER COVER FOR ENHANCED AUDIO PERFORMANCE

CROSS REFERENCE TO RELATED APPLICATION

This application is a continuation-in-part of U.S. Ser. No. 16/751,080, filed on Jan. 23, 2020 now U.S. Pat. No. 11,575,982 issued Feb. 7, 2023, which is incorporated herein by reference.

TECHNICAL FIELD

The present disclosure relates to a method for making a speaker cover that exhibits visual appeal and superior strength with columnar apertures for enhanced audio performance.

BACKGROUND ART

Audio speaker covers have been manufactured from fabrics, thermoplastics, thermosets, perforated metal, expanded metal, woven wire, and the like. Certain materials such as fabric may be thin and have a large open area percentage. This may be ideal for sound transmission. But these materials lack the ability to adequately protect the speaker assembly in environments where human contact and abuse is anticipated. Examples include home audio systems, electronic devices, computers, microphones, portable speakers, and transportation-related audio systems such as cars, trucks, boats, aircraft and the like.

In such applications, substantially rigid audio covers are deployed adjacent to the speaker itself to protect the fragile speaker cone and assembly from damage. Additionally, since these systems are in proximity to the audiophile, visual styling and aesthetics are also necessary in order to produce a cost-effective, yet attractive means of protecting the speaker itself.

In the automobile industry, for example, the car maker tries to offer unique designs while meeting a plethora of worldwide governmental standards and regulations. Speaker cover design may influence the car buyer and help the car maker strengthen its unique brand image and identity. "Design is the emotional approach to any product experience". D. Dudek, NYT, Jan. 8, 2021. In some cases, it is desirable for a speaker cover to be flush and clean, yet be able to obscure speaker components installed behind it. Accordingly, it may be desirable to have a dense array of small apertures that are arranged in a visually pleasing matter without weakening the speaker cover and compromising the fidelity of sound transmission.

Metal speaker covers have historically offered superior sound transmission characteristics compared to plastic speaker covers due to their high strength to weight ratio. Metal audio covers can be produced from a variety of metals including woven metal wire and with sheets of metal which are subject to a variety of processes to create apertures for sound transmission. These single sheet-based processes include metal expanding, punch perforating, laser cutting, water jet cutting, photochemical etching, and powdered metal laser sintering. Individual sheets of these materials are provided with apertures which are often then subjected in finished goods to traditional metal forming techniques combined with a variety of coating and finishing techniques. However, the finished speaker cover needs to be visually pleasing to the audiophile while assuring high fidelity in sound transmission. The penalty for adding a cover is usually sound transmission loss due to interference offered by the solid or the non-open area of the cover that protects the speaker.

The ideal speaker cover is both attractive and cost-effective to manufacture while providing adequate strength that withstands normal abuse and offers reduced sound transmission loss. Metal speaker covers have traditionally offered the best balance of strength and lower levels of sound transmission loss than compared to injection molded speaker covers.

Current methods for making apertures in metal speaker covers generally fail to balance aesthetics, strength, and acoustic performance. Each technology lacks an essential element in that it creates apertures which are less than ideal for minimizing sound transmission loss while maintaining the strength to adequately protect the speaker from abuse.

High-speed drilling or computer numerically controlled (CNC) machining has been used to form apertures in 2D or 3D objects for various purposes. In the speaker cover field, such operations typically deal with one workpiece at a time.

Against this background it would be desirable to realize manufacturing economies by applying precision high speed drilling processes to a single metal workpiece, or a batch or stack of metal sheets so that apertures are formed cleanly without debris or dross remaining adherent to the speaker cover that would diminish the fidelity of sound as it passes therethrough.

The following references are among the art considered before filing this application: U.S. Pat. No. 9,014,411 B2; US 2007/0177754 A1; US 2007/0263878 A1; CA 2011619 C; CN 107948767 A; JP H07225587 A; JP 2018008645 A; KR 100313022 B1; DE102019007656 and WO 2020133911.

SUMMARY

The disclosed manufacturing method involves process steps that make a high fidelity, attractive audio speaker cover with superior strength and an array of precisely spaced columnar apertures that demonstrate superior audio performance compared to the prior art. Often, such audio speaker covers are embodied in the form of a metallic cover. Preferably, the disclosed process employs coordinated high speed drilling operations that are executed by precisely spaced drill bits which spin at a high speed and are advanced at a predetermined rate toward an individual metal blank or a batch or stack of metal blanks from which the speaker covers are made. Such a process enables manufacturing economies to be realized while preserving sound transmission quality and aesthetic appearance in the finished speaker cover, which may require only a few or no post-processing steps.

Thin metal audio speaker covers having adequate strength with a large open area and apertures whose walls are smooth and straight are preferred for both audio performance and speaker cover strength. Desirably, a large open area presents minimal resistance to the transmission of sound waves. Apertures can be spaced closer together if the aperture walls are clean and parallel to one another, rather than being canted or inclined in relation to each other. This contrasts with prior art approaches, which tend to produce apertures that lack smooth walls, have uneven shoulders, are irregular and have walls that are not parallel. Such non-parallelism appears in walls that face each other across a given aperture and in walls that define adjacent apertures.

Straight walled apertures minimize the aperture-to-aperture spacing by maximizing the intervening material lands that are needed to support and impart strength to the speaker cover. Such material also provides some rigidity that tends to protect the speaker cover from abuse.

The open areas available for sound transmission offer a theoretical maximum open area that minimizes sound transmission loss. Thus, the sound engineer may prefer no interruption to the passage of sound waves. Yet the engineer may prefer solid material to provide support and strength. Such preferences may oppose each other.

In many respects, the disclosed method involves a process for producing audio speaker covers with enhanced acoustic performance by processing one or more in a sandwiched arrangement of metal blanks in layers ("batch"). The batch is then secured and exposed to drilling and machining steps. In this way, multiple sheets in a stack of metal are penetrated in one pass to form precisely machined, clean apertures that are devoid of irregularities in either the wall or the shoulder using one or more CNC high-speed drilling heads. If desired, multiple batches may be processed simultaneously in one pass of a collection of high speed drill bits.

These method steps take the manufacture of enhanced audio speaker covers to a higher level of manufacturing efficiency without compromising product quality or jeopardizing the requirements of the sound or materials engineer. The process allows one blank or multiple blanks to be drilled in one penetration of one or more high speed drill bits. Further, following conventional practices, each individual drilled audio speaker cover usually requires post processing cleanup steps, such as de-burring. Thus, prior approaches tend to produce single speaker covers with inferior acoustic properties that are brought on by surface irregularities.

Consider a single aperture of one speaker cover embodiment with a smooth walled parallel aperture. Noteworthy is that the intersection of an aperture wall with a speaker cover surface is predictably regular and orthogonal within manufacturing tolerances. Such a surface presents only minimal interference with the smooth passage of sound waves through the apertures, thus offering high fidelity. Such characteristics favorably compare with prior art approaches used to create apertures in metal for sound transmission.

Aesthetically, columnar apertures result in a speaker cover surface that is substantially free of blemishes or deformation.

In summary, the disclosed method produces superior audio performance in relation to conventional approaches, look good to the audiophile and maintain adequate strength to protect the fragile speaker cone.

The above advantage and other advantages and features of the present disclosure will be readily apparent from the following detailed description of the preferred embodiments when taken in connection with the accompanying drawings.

BRIEF DESCRIPTION OF THE DRAWINGS

FIG. 3 is a front view of part of an audio speaker cover with a patterned array of apertures of various sizes in which aperture density for a given aperture size is greater than in prior practices.

DETAILED DESCRIPTION

As required, detailed embodiments of the present invention are disclosed herein. However, it is to be understood that the disclosed embodiments are merely exemplary of the invention that may be embodied in various and alternative forms. The Figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features of the present invention as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

One method of manufacturing one or more audio speaker cover drilled blanks is summarized in the flowchart of FIG. 1 and is described below.

Preferably, the method employs computer numerical controlled (CNC) machines. Each CNC machine may have one or more machining cells. Each cell may be provided with multiple spindles or collets which interface with a common CNC bed. This bed controls workpiece movement in relation to imaginary X and Y axes. This common bed optionally preferably lies parallel to a plane of one or more metal sheets or blanks ("workpieces") that may be treated individually or be registered in an optional batch or stack of sheets ("stack").

In some embodiments, the audio speaker cover is made from a material selected from the group consisting of stainless steel, aluminum, low carbon steel, titanium, wood, plastics, composites including laminated layers and composites of one or more dissimilar materials.

Figure 2:
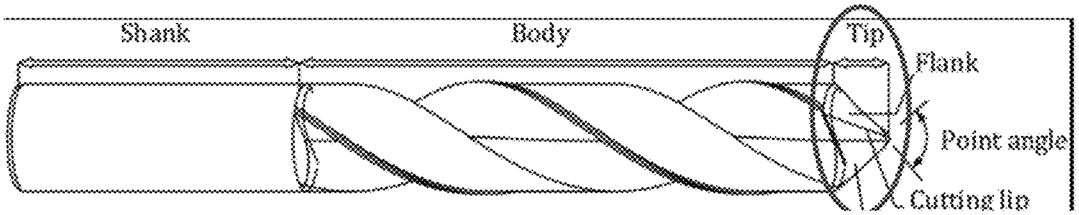
FIG. 2 depicts a representative drill bit with related terminology.

In one variant, each cell has one or more collets which retain one or more individual drill bits. Such drill bits may be made from various materials and be of varying configuration. This includes but is not limited to bit material type (high strength steel, ceramic, etc.), bit material coatings, bit material finish, bit diameter, bit length, shank length, body length, flute type, flute angle, and the like as suggested in FIG. 2.

Preferably, each cell or spindle is air-driven to achieve a desired number of rotations per minute (RPM's) that are suitable for both the bit and the penetration rate of that bit into the individual blank sheet or stack thereof. Rotation speed ranges from 1,000-250,000 RPM. Due to the frictional heat generated during high-speed drilling, each spindle is preferably water- or fluid-cooled.

An imaginary bit axis lies at the center of rotation of each bit. Each spindle preferably has an independently controlled penetration rate and depth of travel which are desirable in the production of the desired straight wall apertures with square shoulders at the surface of the workpiece.

Figure 1:
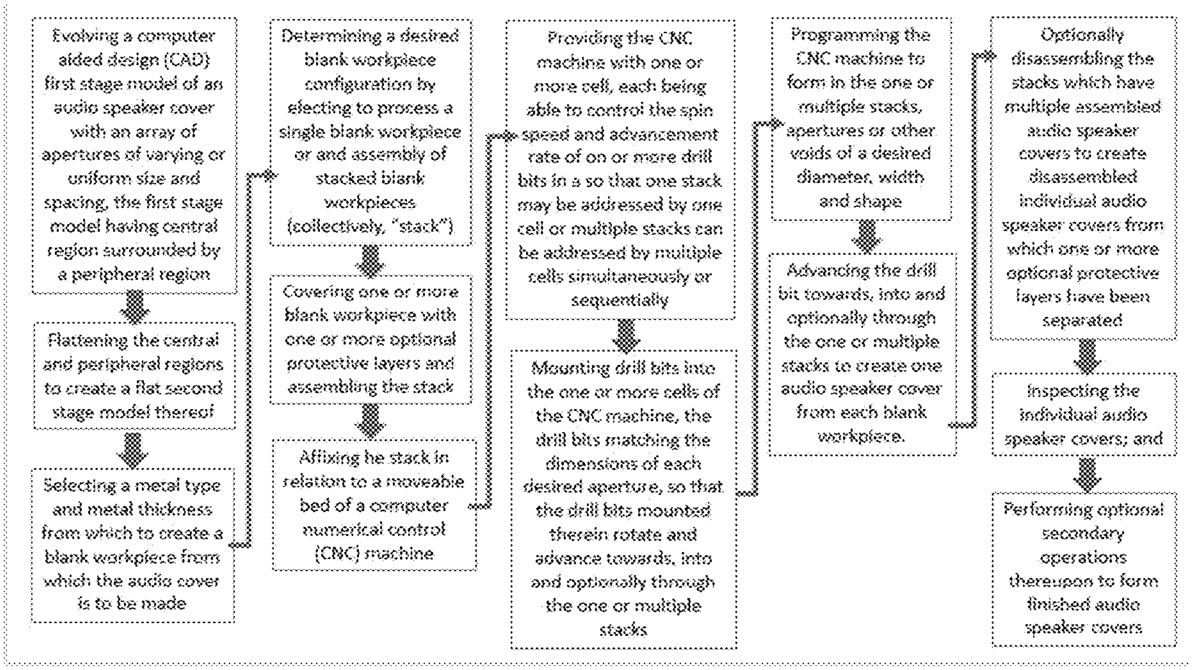
FIG. 1 is a representative process flow chart that depicts some of the main steps in practicing one way to perform the disclosed manufacturing process.

Broadly stated, in one variant, the manufacturing process, as suggested in FIG. 1 includes these steps, not necessarily in the sequence presented, of:

- evolving computer-aided design (CAD) first stage model of an audio speaker cover with an array of apertures of varying or uniform size and spacing, the first stage model having a central region surrounded by a peripheral region;
- flattening the central and peripheral regions to create a flat second stage model thereof;
- selecting a metal type and metal thickness from which to create a blank workpiece from which the audio speaker cover is to be made;
- determining a desired blank workpiece configuration by electing to process a single blank workpiece or an assembly of stacked blank workpieces (collectively, "stack");
- covering one or more blank workpieces with one or more optional protective layers and assembling the stack;
- affixing the stack in relation to a moveable bed of a computer numerical control (CNC) machine;
- providing the CNC machine with one or more cells, each cell being able to control the spin speed and advancement rate of one or more drill bits in a cell so that one stack may be addressed by one cell or multiple stacks can be addressed by multiple cells simultaneously or sequentially;
- mounting drill bits into the one or more cells of the CNC machine, the drill bits matching the dimensions of each desired aperture, so that the drill bits mounted therein are rotated and advanced towards, into and optionally through the one or multiple stacks;
- programming the CNC machine to form in the one or multiple stacks apertures or other voids of a desired diameter, width and shape;
- advancing the drill bits towards, into and optionally through the one or multiple stacks to create one audio speaker cover from each blank workpiece;
- optionally disassembling the stacks which have multiple assembled audio speaker covers to create disassembled individual audio speaker covers from which one or more optional protective layers have been separated;
- inspecting the individual audio speaker covers; and
- performing any optional secondary operations thereupon to form finished audio speaker covers.

In more detail, the manufacturing process (FIGS. 1, 3) in one variation begins with the creation of a CAD design for a 2D or 3D audio speaker cover that is designed with an array of columnar apertures of varying size, density and shape to achieve the desired strength, audio performance and visual aesthetics. The array of apertures along with the overall form of the finished audio cover is typically, but is not necessarily, flattened into one plane before CNC machining of apertures into one or more sheets of a given material and thickness. A boundary surrounding the overall length and width of the array of apertures should exceed the limits of the X and Y travel of the high-speed CNC machine.

The process of producing the audio speaker cover involves selecting a primary audio speaker cover material type and material thickness. Its dimensions are such that the workpiece from which the audio speaker cover is formed is larger than the dimensions of the aperture array. The material type may optionally possess a desired surface finish or texture on either side of the sheet. Furthermore, one or more protective layers may also be temporarily affixed to one or more surfaces to protect the sheet during the high-speed machining process and any subsequent secondary operations post machining. Those operations may include metal blanking, draw forming, cam forming, and other secondary conversion processes.

An optional layup process step involves assembling a stack or batch of workpieces. That step includes layering one or sheets and interposing optional protective layers. The next step is to register the stack underneath the spindle or cell of the CNC machine so that the desired pattern can be firmly machined within the machine's operating window. Finally, the stack is affixed to the machining table through a suitable mechanical means, such a clamping mechanism.

A programming step begins with selecting a drill bit whose diameter or width most closely matches the diameter or width of either the aperture or the width of a "snaking" shape to be machined. In alternate embodiments, at least some of the apertures are preferably non-circular. In such cases, the non-circular apertures have a shape selected from the group consisting of oval, ovate, ovoid, elliptical, egg-shaped, lobe-, amoeba- or kidney-shaped and combinations thereof. While the preferred embodiment is a round aperture, "snaking shapes" of various lengths and patterns may be machined into the blanks by compound displacement of the tool: traversing in the X and Y directions after the tip of the bit has penetrated at least partially through the entire depth of a stack of assembled workpieces.

The flute length of each bit is selected such that its length is greater than or equal to the thickness of a stack to facilitate chip or dust removal above and/or below the stack. In alternate embodiments, at least some of the apertures are non-circular. In such cases, the non-circular apertures have a shape selected from the group consisting of oval, ovate, ovoid, elliptical, egg-shaped, lobe-, amoeba- or kidney-shaped and combinations thereof.

The CNC machine can be programmed to form precise columnar apertures by axial penetration or non-circular apertures with parallel walls and square shoulders by compound displacement of the drill bit. The size and shape of each aperture is unique to each drill bit and it controlled movement. The number of unique drill bits is only limited by the number of available locations in the machine carousel, but can typically range from 1-400.

The RPM and plunge rate for each bit also is selected in the programming process. Smaller apertures typically require higher RPM and slower plunge rates. Larger apertures are suited to a lower RPM and higher plunge rate to clear chips effectively. Programming continues to define the array of apertures until the entire array is specified. If desired, any blank location apertures outside the speaker cover perimeter itself may be specified. Such apertures may facilitate registration of the speaker cover in relation to machines used in optional secondary processing operations, or its placement in the environment of use.

Figure 3:
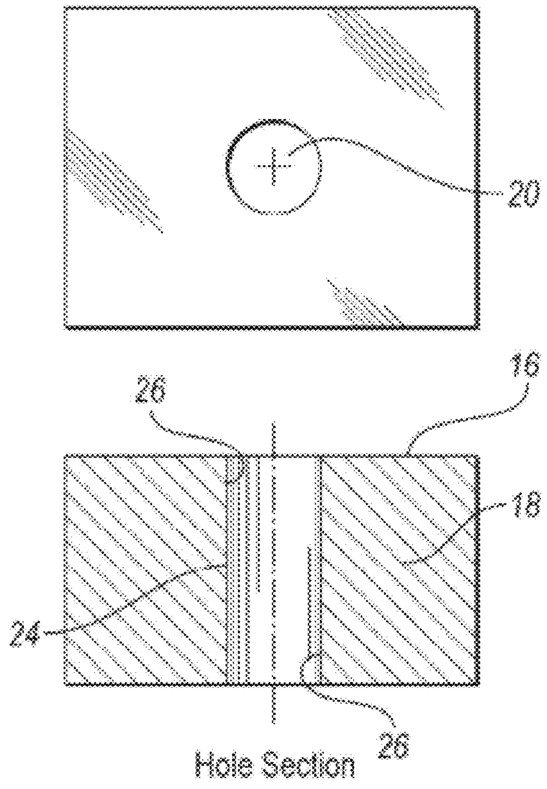
FIG. 3 is a sectional and top plan elevational view of a representative aperture defined in an audio speaker cover with orthogonality at the inner and outer surfaces thereof.

If a stack of sheets in a batch is involved in the operation, the CNC machining process handles the entire stack or batch of stacks according to the programming instructions until the array of apertures is formed plus any features necessary to process the workpieces. These features can include registration features, plus any other apertures for secondary processing after the entire stack of sheets and protective layers have been machined. FIG. 3 is a visual process flow diagram to accompany FIG. 1.

Once the machining of a stack has been completed, the individual machined sheets or stacks of blanks (s) are separated, inspected and packaged for any further processing and finishing operations. These operations are typically performed on an individual sheet basis to convert a single sheet into a finished audio speaker cover. These operations include processes which include but are not limited to:

perimeter blanking
draw forming
cam forming
logo machining, etching, or printing
anodizing
physical vapor deposition
painting
clear or translucent coatings
bezel assembly
masking cloth assembly
electrical integration
add-on logo or badging
adding foams, sealants, or other materials.

FIG. 3 is an enlarged sectional view and an elevational view of a portion of an audio speaker cover with a representative aperture that is precisely machined therethrough. Thin metal speaker covers preferably have adequate strength with large open areas and apertures for uninterrupted sound wave passage whose walls are smooth and straight. Especially when the apertures are closely spaced, it is desirable that the smooth and clean lands therebetween (see, e.g., FIG. 6) are unimpaired by debris created during the machining step. Such an arrangement is ideal for both audio performance and speaker cover strength. Apertures can be spaced closer together if the aperture walls are parallel to one another as compared to those described above in the prior art, which generally are not parallel to one another when strict manufacturing parameters are imposed.

Straight walled apertures minimize the aperture-to-aperture spacing by maximizing the remaining material available for speaker cover strength and protect the speaker from abuse. The open area available for sound transmission can therefore achieve a theoretical maximum open area to minimize sound transmission loss. FIG. 3 depicts for example a single aperture smooth walled parallel aperture.

Figure 4:
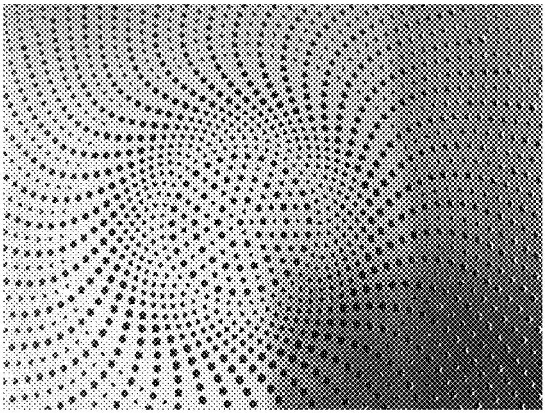
FIG. 4 is a sectional fragmented view of a speaker cover positioned in relation to a sound source.

Aesthetically, columnar apertures also result in a surface that is free of blemishes and deformation in relation to prior approaches art used to create apertures in metal for sound transmission. FIG. 4 is a front view of a speaker cover with a dense array of columnar apertures of varying size and configuration that create in this example, a swirling effect. A central area of the speaker cover may include apertures that have a range of diameters at the outer surface 28. In the example shown the swirling visual effect is thus created. In such cases, the apertures proximate one region of the audio speaker cover may have a diameter that differs from the diameter of apertures in another region of the audio speaker cover.

The Figures depict various aspects of representative embodiments of an audio speaker cover 10 with a central region 12 and a peripheral region 14. In some embodiments, the central region has a generally planar, concave or convex surface 16. An audio speaker cover body 18 lies below the cover 10.

In a preferred embodiment, the audio speaker cover body 18 defines a plurality of apertures 20. Lands 22 lie between at least some of the apertures 20. The apertures 20 have precisely formed cylindrical walls 24 that meet the speaker cover surface 16 orthogonally, especially in the central region 12 of the speaker cover body 18.

Figure 5:
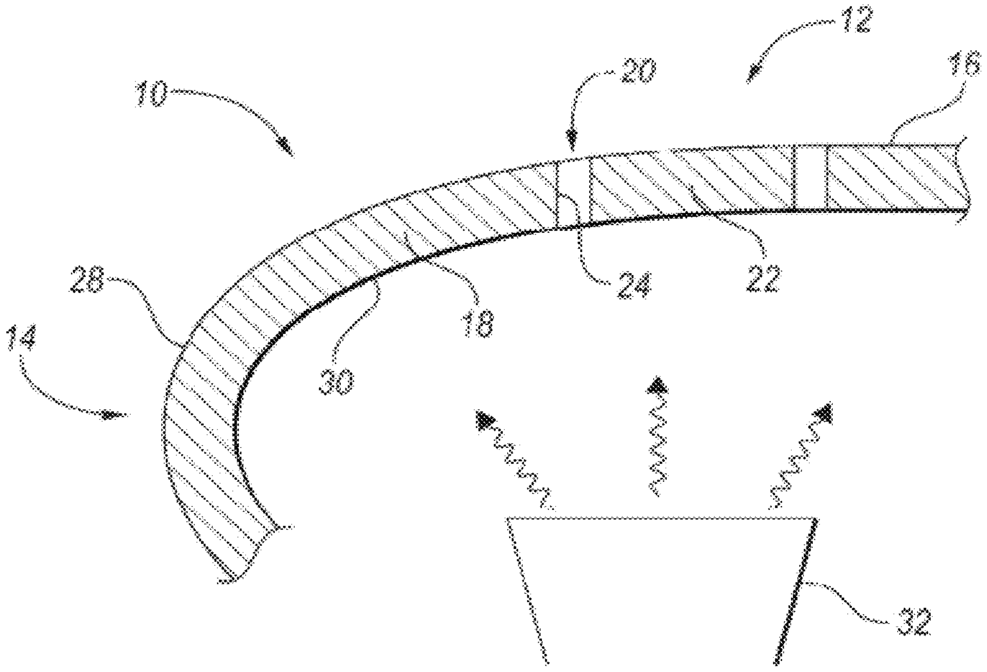
FIG. 5 is a fragmented sectional view of a peripheral region of an audio speaker cover before and after deformation.

With primary reference to FIG. 5, the central region 12 of the audio speaker cover 10 can be imagined to occupy an area (C). The apertures 20 have a total area (A) and the lands have a total area (L). It can be seen that $C=A+L$, and A=30 to 85 percent of C.

Without being bound by a particular theory, it is believed that the relatively high percentage of aperture area (A) in relation to audio speaker cover area (C) is enabled by precisely formed apertures 20. At least some of the apertures 20 have cylindrical walls 24 that have a uniform diameter along their depth. Further, at least some of the apertures 20 have shoulder portions 26 (FIG. 3) that are substantially square, within generally acceptable manufacturing tolerances. Thus, at least some of the apertures 20 have a cylindrical wall 24 that has shoulder portions 26 that lie orthogonally at the outer surface 28 and inner surface 30.

In more detail (FIG. 5), the audio speaker cover 10 has an outer surface 28 that faces an observer and an inner surface 30 that faces a speaker 32. At least some of the apertures 20 in the central region 16 have a total area (A) at the outer surface 28 that equals the total area (A) at the inner surface. 30.

At least some cylindrical walls 24 are smooth, such that they offer minimal interference to sound waves that pass from the speaker 32 to the outer surface 28 of the audio speaker cover 10.

Lands 22 (FIG. 5) between the apertures 20 occupy between 15 and 70 percent of the area (C) of the central region 16 of the audio speaker cover. Without being bound by a particular theory, it is believed that the area of lands is relatively low in comparison to prior art solutions. This is likely due to precisely formed apertures with square shoulders between which there is minimal deformation or debris, unlike conventional aperture-forming techniques. As a result, the total number of lands present minimal obstruction to sound waves that pass through the audio speaker cover. Some audio test results (described below) confirm that sound distortion through the apertures is minimal.

Figure 6:
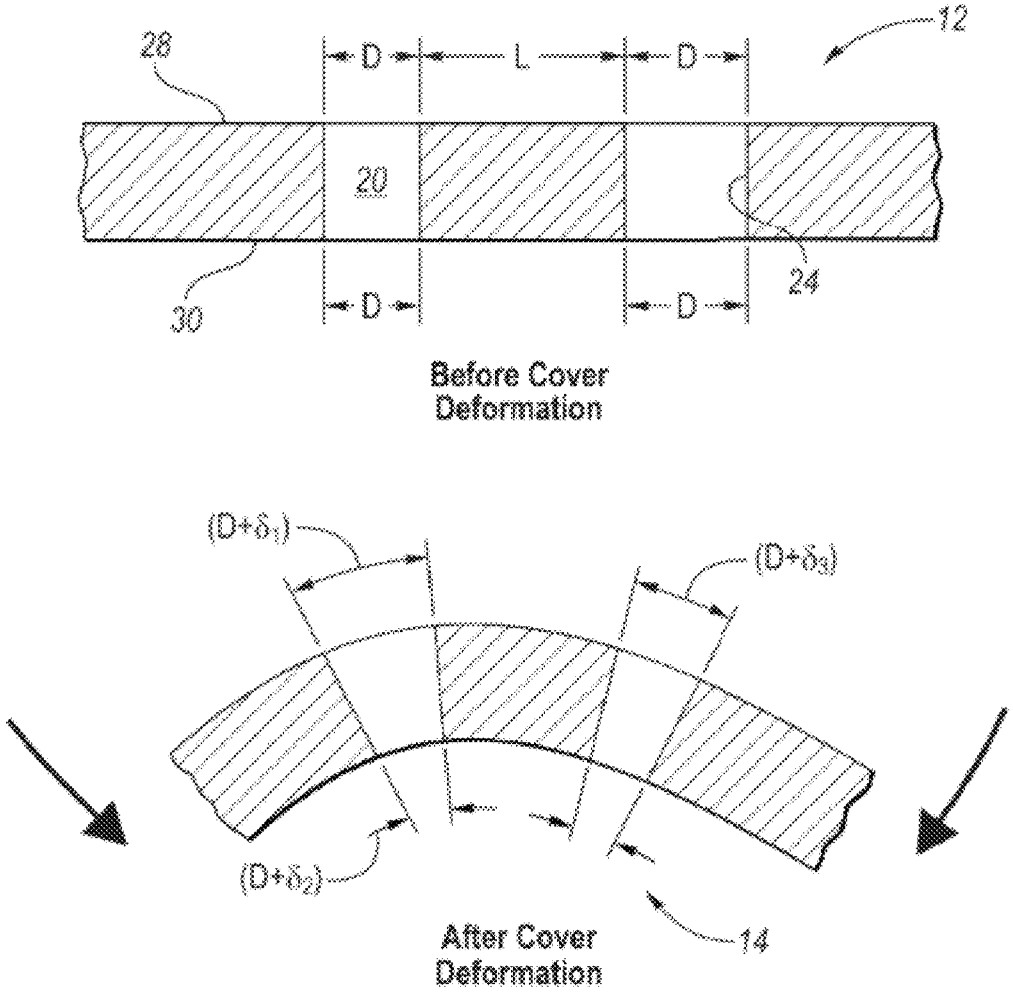
FIG. 6 illustrates a sectional view of a speaker cover before and after deformation.

It will be appreciated that curvature of the audio speaker cover 10 during forming may have some distorting effect on otherwise perfectly cylindrical walls 24 and apertures 20 that are circular at the outer cover surface 28 and inner cover surface 30 (FIGS. 4, 6-7). Consider the peripheral region 14 of the audio speaker cover 10. That region has an outer surface 28 and an inner surface 30. The apertures 20 of the central region 12 have an average diameter (D) that is uniform across the cylindrical walls 24 of the apertures 20. Upon shaping from a non-planar configuration (FIG. 6), the apertures 20 of the peripheral region 14 have an average diameter at the outer surface 28 which may differ somewhat from aperture diameter at the inner surface 30. But at least some of the apertures 20 are cylindrical in the substantially undistorted central region 16, through which most of the sound waves are transmitted.

Nevertheless, apertures 20 of the peripheral region 14 have walls 24 that remain smooth after deformation of a blank that forms the central region 16 and the peripheral region 14 of the audio speaker cover 10. Such smoothness creates only minimal disturbance to sound waves that pass therethrough.

As mentioned above, it will be appreciated that in some embodiments, the central region 12 may be convex or concave, bulging outwardly or inwardly in relation to a speaker 32.

Preferably, the audio speaker cover 10 has an inner surface 30 and outer surface 28 that is substantially free of deformation or blemish.

Tests (described further below) have shown that the sound transmission loss following passage of sound waves through the audio speaker cover over a frequency range of 60-15,000 Hz is less than about 5 dBm.

Thus, to manufacture speaker covers with apertures having cylindrical walls and square shoulders, forming methods are followed that avoid problems created by such conventional approaches as injection molding, woven wire, expanded metal, punching, laser forming, and chemical etching.

To make the disclosed speaker covers in volume, as mentioned earlier, one or more blanks may be secured in relation to each other or to a holder, each blank having an inner surface and an outer surface. Apertures are then formed in the one or more blanks so that cylindrical walls define one or more apertures. The cylindrical walls meet at least some of the blank inner surfaces and outer surfaces orthogonally, often without the need for a de-burring step.

In practice, process variables aperture size; pilot hole size (if any); aperture spacing (edge of hole to edge of hole); material thickness and type; maximum blank size; hole and position tolerance; and the number of different aperture diameters per speaker cover. Other factors include drill type; spindle speed; number of blanks per stack; and spindle heads per machine.

EXPERIMENTAL DATA

Experiments have been undertaken to confirm superior audio performance and reduced sound transmission loss following the manufacturing steps described above. Minimizing the sound transmission loss and distortion through a speaker cover is desirable in an audio system. Any material used to protect a fragile speaker cone from abuse will likely result in some degree of sound transmission loss at both low and high frequencies. It would be desirable to minimize that loss.

One series of experiments compared the sound transmission response of two materials compared to air as a baseline. In this test setup, a speaker and a microphone were located 1 m from one another, representing an average distance from an automobile occupant. An initial baseline frequency sweep (from 60-15,000 Hz) was measured with only air between the speaker and microphone located in an anechoic chamber. Higher end frequencies are more easily distorted than lower end frequencies.

Two cover materials (1—columnar apertures; 2—irregular apertures) were interposed between the speaker and microphone and run through the same frequency sweep. The average aperture size of both materials was identical.

Test results showed that the columnar apertures result in generally less sound transmission loss when compared to the irregular apertures at both low and high frequencies throughout the sweep. Lower levels of sound transmission loss result in superior audio performance.

In summary, the disclosed techniques produced superior audio performance in relation to conventional approaches and maintained adequate strength to protect the fragile speaker cone.

In some cases, it may be useful to deploy means for attaching the audio speaker cover to a mounting surface. If so, the means for attaching may include tabs and/or snap features extending from the peripheral region toward a speaker cone. Preferably, the means for attaching lie generally parallel to an imaginary line that is perpendicular to the central region.

If desired, the audio speaker cover may have lands that are devoid of apertures. Such platforms may accommodate additional layers of printed, machined, deposited, painted or drilled material or logos or coatings to signify a brand or for aesthetic purposes. This may achieve a desired appearance or texture or indicate a source or origin of the audio speaker cover. For example, badging may indicate the source or origin of the audio system.

Further embodiments of the audio speaker cover may have means for attaching a low density masking material or foam to an underside of the audio speaker cover for hiding internal speaker components.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

TABLE OF REFERENCE NUMBERS

| Reference No. | Component |
|---|---|
| 10 | Audio Speaker Cover |
| 12 | Central Region |
| 14 | Peripheral Region |
| 16 | Planar Surface |
| 18 | Audio Speaker Cover Body |
| 20 | Apertures |
| 22 | Lands |
| 24 | Cylindrical Walls |
| 26 | Shoulder Portions |
| 28 | Outer Surface |
| 30 | Inner Surface |
| 32 | Audio Speaker |

What is claimed is:

1. A method for making an audio speaker cover from a blank workpiece either individually or from an assembly of stacked blank workpieces using a computer numerical control (CNC) machine, the method comprising steps, not necessarily in a sequence presented, of:

- evolving a computer-aided design (CAD) model of the audio speaker cover with an array of apertures of varying or uniform size and spacing, the model having a central region surrounded by a peripheral region;
- flattening the central and peripheral regions of the model to create a flat model of the audio speaker cover;
- selecting a metal type and a metal thickness from which to create the blank workpiece or the assembly of stacked blank workpieces;
- determining a desired blank workpiece configuration by electing to process one blank workpiece individually or the assembly of stacked blank workpieces together;
- covering the one blank workpiece or the assembly of stacked blank workpieces;
- affixing the one blank workpiece or the assembly of stacked blank workpieces together in relation to a moveable bed of the computer numerical control (CNC) machine;
- providing the CNC machine with one or more cells, each cell being able to control a spin speed and an advancement rate of one or more drill bits in a cell so that the one blank workpiece or the assembly of stacked blank of the blank workpieces may be addressed by one cell alone or the one blank workpiece or multiple stacks of the blank workpieces can be addressed by multiple cells simultaneously or sequentially;
- mounting the one or more drill bits that match the dimensions of each desired aperture into the one or more cells of the CNC machine that spins the one or more drill bits mounted therein;
- advancing the one or more spinning drill bits towards, into and through the one individual workpiece or the assembly of stacked workpieces or multiple stacks of the blank workpieces; and
- programming the CNC machine to form one or more audio speaker covers, each having a central region with apertures or other voids of a desired diameter, width and footprint with parallel walls and square shoulders, each formed audio speaker cover having its central region with lands separating the apertures and a peripheral region that is devoid of apertures.

2. The method of claim 1, further comprising the step of providing the central region of the audio speaker cover with an outer surface and an audio speaker cover body below the outer surface, defining in the audio speaker cover a plurality of apertures with the lands between at least some of the apertures, the apertures having parallel walls that meet the outer surface orthogonally.

3. The method of claim 1, further comprising the step of providing the audio speaker cover with, an area (C) in the central region;

a total area (A) of the apertures; and lands between the apertures with a total area (L), such that $$C=A+L; \text{ and}$$

A=30 to 85 percent of C.

4. The method of claim 3 wherein an outer surface of an audio speaker cover faces an observer and below the outer surface lies an inner surface that faces a speaker of an audio system, at least some of the apertures in the central region having an area (A) at the outer surface that equals an area (A) at the inner surface of the audio speaker cover for sound transmission without distortion.

5. The method of claim 4 wherein at least some of the apertures have a cylindrical wall such that at least some of the cylindrical walls lie perpendicular to the outer surface.

6. The method of claim 5 wherein at least some cylindrical walls of the apertures in the audio speaker cover are smooth, such that they offer minimal interference to sound waves that pass from the speaker to and through the outer surface of the audio speaker cover.

7. The method of claim 3, further comprising the step of defining the apertures so that they occupy between 30 and 85 percent of the area (C) of the central region of the audio speaker cover at its inner surface and at its outer surface.

8. The method of claim 3, further comprising the step of defining the lands so that they occupy between 45 and 70 percent of the area (C) of the central region of the audio speaker cover.

9. The method of claim 1, further comprising the step of providing:

- the peripheral region of the audio speaker cover with an outer surface and an inner surface, the apertures of the central region with an average diameter (D) that is uniform across the cylindrical walls of the apertures;
- the apertures of the peripheral region with an average diameter $(D+\partial_1)$ at the outer surface and $(D-\partial_2)$ at the inner surface; and
- the apertures of the peripheral region with walls that remain smooth after deformation of the individual blank workpiece or the assembly of stacked blank workpieces by the CNC machine in creating the central region and the peripheral region of the audio speaker cover, thereby presenting minimal disturbance to sound waves that pass therethrough.

10. The method of claim 1 further comprising the step of providing the apertures in the one or more speaker covers with a range of diameters, such that apertures proximate one region of the audio speaker cover have a diameter that differs from the diameter of apertures in another region of the audio speaker cover.

11. The method of claim 1 further comprising the step of providing at least some of the apertures in the individual one or the one or more speaker covers with a periphery that is non-circular.

12. The method of claim 11, further comprising the step of providing the apertures with a shape selected from the group consisting of oval, ovate, ovoid, elliptical, egg-shaped, lobe-shaped, amoeba-shaped or kidney-shaped and combinations thereof.

13. The method of claim 1, further comprising the step of providing the central region with a shape that is convex or concave, bulging outwardly or inwardly in relation to an audio speaker.

14. The method of claim 4 wherein the inner surface and the outer surface are free of deformation or blemish.

15. The method of claim 1 wherein sound transmission loss following passage of sound waves through the audio speaker cover over a frequency range of 60-15,000 Hz is less than 5 dBm.

16. The method of claim 1 wherein an audio speaker body is made from a material selected from the group consisting of stainless steel, aluminum, low carbon steel, titanium, wood, plastics, composites including laminated layers and composites of one or more dissimilar materials.

17. The method of claim 1 further including the step of:

providing means for attaching the audio speaker cover to a mounting surface, the means for attaching including tabs and/or snap features extending from the peripheral region toward a speaker cone, the means for attaching lying generally parallel to an imaginary line that is perpendicular to the central region.

18. The method of claim 1 further including the step of:

providing lands that are devoid of apertures for accommodating additional layers of printed, machined, deposited, painted or drilled material or logos or coatings on an outer surface of the audio speaker cover for aesthetic purposes to achieve a desired appearance or texture or indicate a source or origin of the audio system.

19. The method of claim 1 further including the step of providing means for attaching a low density masking material or foam to an underside of the audio speaker cover for hiding internal speaker components.

20. A method of making an audio speaker cover using a computer numerical control (CNC) machine by following at least some of these steps, not necessarily in the sequence listed:

evolving a computer-aided design (CAD) first stage model of the audio speaker cover with an array of apertures;

determining a desired blank workpiece manufacturing configuration by electing to process an individual blank workpiece or an assembly of stacked blank workpieces;

affixing the individual blank workpiece or the assembly of stacked blank workpieces in relation to the computer numerical control CNC) machine; and addressing the individual blank workpiece or the assembly of stacked blank workpieces simultaneously or sequentially to create apertures with parallel walls and square shoulders to provide strength while minimizing losses in sound transmission, the apertures and intervening lands providing a visually attractive appearance to an observer.

* * * * *